UNITED STATES PATENT OFFICE.

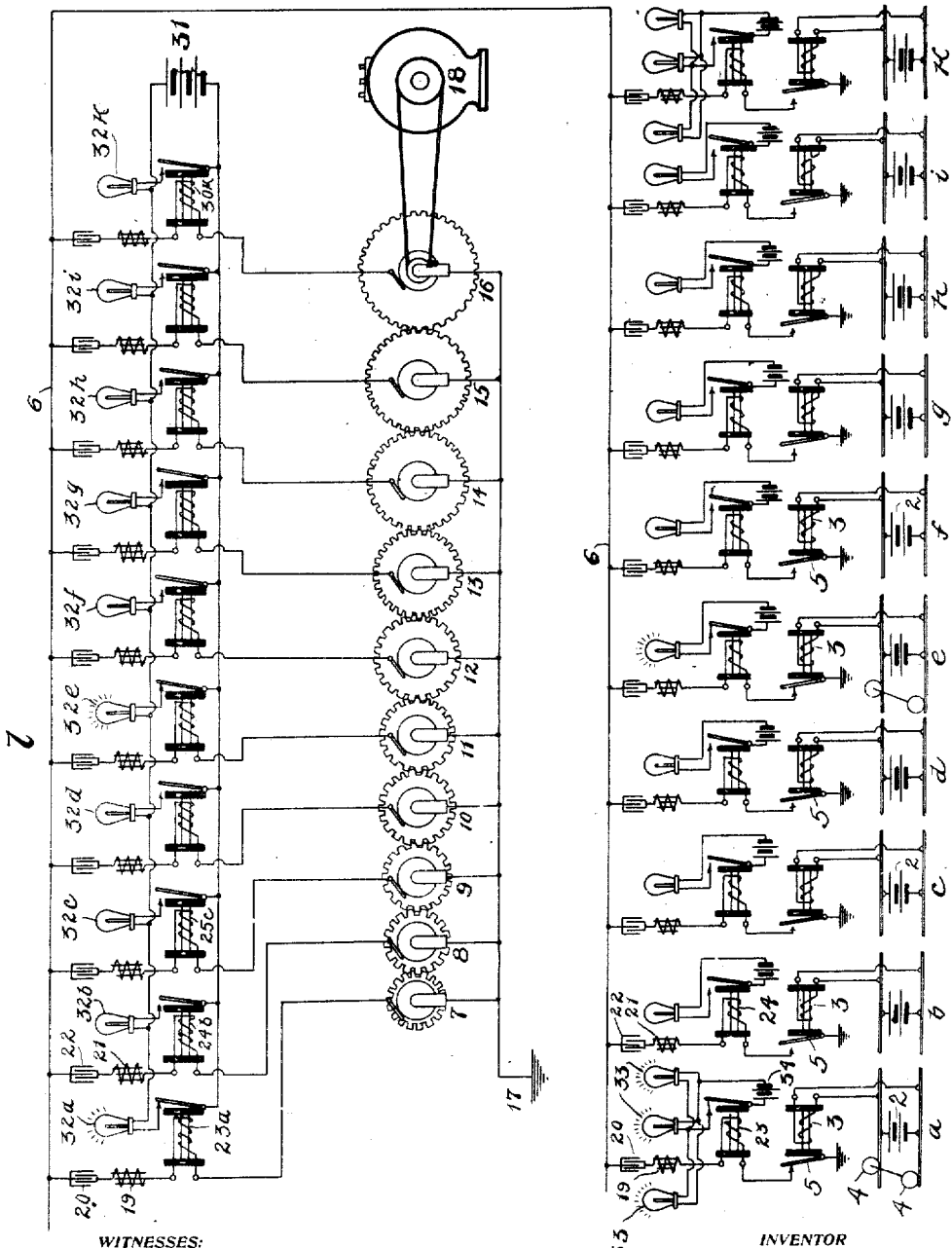

MAX W. ZABEL, OF CHICAGO, ILLINOIS.

SIGNALING SYSTEM FOR RAILWAYS.

No. 917,830.  Specification of Letters Patent.  Patented April 13, 1909.

Application filed April 13, 1907. Serial No. 368,027.

*To all whom it may concern:*

Be it known that I, MAX W. ZABEL, a citizen of the United States, residing at Chicago, in the county of Cook and State of Illinois, have invented a certain new and useful Improvement in Signaling Systems for Railways, of which the following is a full, clear, concise, and exact description, reference being had to the accompanying drawings, forming a part of this specification.

My invention relates to signaling systems for railways and has for its object the provision of improved means for indicating at a suitable predetermined point the movement of trains in the operation of railway systems.

It is frequently the practice to divide a system into train despatchers' divisions, which may be about one hundred miles long, and this division is sub-divided again into suitable blocks.

More particularly my invention contemplates that the passage of trains from one block to another, and the movement of the trains in the block may be correctly indicated at the train despatcher's office, so that at all times he can be fully informed as to the positions of his various trains.

I will describe my invention more in detail by reference to the accompanying drawing illustrating one embodiment thereof. In the illustration I have shown for the sake of clearness, one train despatcher's division comprising the blocks $a$, $b$, $c$, $d$, $e$, $f$, $g$, $h$, $i$ and $k$. This train despatcher's division may be assumed to be one hundred miles long, and the various blocks ten miles long, that is, the stations may be considered to be about ten miles apart.

I insulate the rail sections of one block from the rail sections of the adjoining blocks. I then provide in each block a battery 2 which through the rails are in closed circuit with a relay 3 which relay, therefore, is normally attracted. When, however, the wheels of a train enter block $a$ as shown for instance, then said wheels, diagrammatically indicated at 4 4, short circuit the battery 2 through said wheels and the connecting axle, and thereby allow the armature 5 of the relay 3 to fall back and make a circuit connection.

I provide a line wire 6 running along the right-of-way, which line wire enters the train despatcher's office 1 and is there connected to suitable generators, 7, 8, 9, 10, 11, 12, 13, 14, 15, and 16. I preferably permanently connect these generators to the line wire 6.

One side of the generators 7 to 16 is connected to ground at 17. I prefer to gear the armature shafts of these generators together, so that they will furnish alternating currents of different pre-determined frequencies, for instance generator 7 may give a frequency of 10, generator 8 a frequency of 20 and so on up to generator 16 which may give a frequency of 100 cycles per second. A suitable prime mover 18 is provided for operating the generators. This prime mover has suitable governing facilities, so that it will operate at any uniform speed and thus keep the frequencies as supplied by the generators constant. I connect the generators to the line wire 6, through the inter-position of suitable reactive devices, for instance generator 7, is connected to the line 6, through an impedance coil 19, and a condenser 20. The values of the impedance coil 19 and the condenser 20 are so chosen that they will permit the operative flow there through only of a frequency of 10 or very nearly 10. All other frequencies being practically excluded, thus generator 8 is connected to the line wire 6 through the inter-position of impedance coil 21 and condenser 22 which permits of the operative passage there through only of the frequency 20. In this manner the various frequencies from 10 to 100 as delivered by the generators is constantly maintained upon the line wire 6, and no serious interference is caused, because one side of the said generators is grounded, and because the impedance coils and condensers associated with the respective generators only permit of the operative passage therethrough of alternating currents of the predetermined frequency.

Suitable provision, such for instance as the insulation of iron in the core of the impedance coils, is made to lessen harmonic inter-action. The line wire 6 passing along the blocks from $a$ to $k$ is connected as follows: For instance at block $a$ the impedance coil 19 and condenser 20 are of the same proportionate values as the impedance coil 19 and condenser 20 at the train despatcher's office, thus of all the frequencies that are constantly maintained on the line wire 6, there is one viz. that delivered by generator 7 which can flow through the relay 23 when the circuit through said relay 23 to impedance coil 19 and condenser 20 is grounded by the armature 5 of the relay 3. Likewise impedance coil 21 and condenser 22 at block $b$ will let through only such frequency as is furnished by generator 8, so that relay 24 will operate only when the circuit through said relay and its connected impedance coil and condenser is grounded through the armature 5 of relay 3 in block $b$. The same is true at the train despatcher's office where relay $23^a$ operates only as relay 23 at block $a$ operates, in other words relay $23^a$ will operate when there is a train in block $a$, relay $24^b$ operates when there is a train in block $b$, relay $25^c$ operates when there is a train in block $c$, and relay $30^k$ operates when there is a train in block $k$. Similar conditions prevail for the intervening blocks and relays.

I have provided at the train despatcher's office suitable current supplying means 31 which can preferably furnish current to lamps 32 the circuit through which lamps is closed and controlled by the relays $23^a$, $24^b$, etc. thus we have at the train despatcher's office various lamps $32^a$, $32^b$ up to $32^k$, which burn whenever there is a train corresponding to said lamps in the respective blocks. As the train moves into one block it short circuits the corresponding relay 3, thus grounding the line wire 6 through the proper impedance coil and condenser, and thus but one frequency will operatively flow thus to operate the corresponding lamp. Likewise a train in a different block will ignite its corresponding lamp, and it will permit the operative flow of a current having a frequency corresponding to said block. I provide lamps 33 in block $a$ which are associated with current supplying means 34 which are under the control of relay $23^a$ thus whenever a train is in block $a$ through the lamps 33, it sets a signal along the right-of-way in front of it and behind it, thus giving notice of its movement along the right-of-way at the same time that it indicates its motion at the train despatcher's office.

While I have herein shown and particularly described the preferred embodiment of my invention, I do not wish to limit myself to the precise construction and arrangement as herein shown and particularly described, but Having thus set forth the essential requirements of an operative system, what I claim as new and desire to secure by Letters Patent is:

1. A signaling system for railways comprising a signal receiving station, a railroad track, a selective signal receiving device at said station, and electric means electrically associated with said railroad track adapted to selectively operate said signal receiving device to indicate various positions of trains on said railroad track.

2. A signaling system for railways comprising a signal receiving station, a railroad track, a selective signal receiving device at said station, and electric means electrically associated with said railroad track and under the selective control of trains along said railroad track adapted to selectively operate said signal receiving device to indicate the position of trains along said railroad track.

3. A signaling system for railways comprising a selective signal receiving device associated with a plurality of sections of a railroad track, and electric means electrically associated with sections of said railroad track for selectively operating said signal receiving device by cars in the different sections.

4. A signaling system for railways comprising a selective signal receiving device associated with a plurality of sections of a railroad track, and electric means associated with each section of track and controlled by the presence of cars in their respective sections to selectively operate said selective signal device.

5. A signaling system for railways comprising a selective signal receiving device associated with a plurality of signal operating means adapted for electrical connection respectively to various sections of a railroad track, and circuit changing means associated with each section and controlled by cars in said section, said circuit changing means being associated with the signal operating means to selectively operate the aforesaid selective signal receiving device.

6. A signaling system for railways comprising a signal receiving station, a railroad track divided into sections, an electric device electrically associated with each said section of track and connected to the signal receiving station, and circuit controlling means whereby railroad cars in any section will send a selective signal to the signal receiving station.

7. A signaling system for railways comprising a selective signal receiving device associated with the various sections of a railroad track, electric means associated with each section of the railroad track for transmitting a selective signal to said signal receiving device, railroad cars for operating said electric device, and a signal provided on the right-of-way of each section together with means for operating said signal when a selective indication is transmitted from its associated section to the signal receiving station.

8. A signaling system for railways comprising a selective signal receiving device, a plurality of sections of railroad track, electric means associated with each section for the purpose of selectively operating the signal receiving device, railroad cars for operating said electric means, a signal provided with each section, electric device for operating a signal when its associated section transmits a selective signal to the receiving station, and additional signals for adjoining sections operated by the first aforesaid signal.

9. A signaling sytem for railways comprising a selective signal receiving device, a plurality of sections of railroad track, electric means associated with each said section for the purpose of selectively operating the signal receiving device, railroad cars for operating said electric means, a signal provided with each section, electric devices for operating a signal when its associated section transmits a selective indication to the receiving station, and an additional signal operating conjointly with said last mentioned signal.

10. A signaling system for railways comprising a selective signal receiving device, a plurality of sections of railroad track, an electric device electrically connected to each section of track, said device being adapted to change it circuit conditions when cars are present in its associated section, and current supplying means whereby the operation of said track devices transmit respectively selective indications to the signal receiving device.

11. A railway signaling system comprising a selective signal receiving device associated with a plurality of sections of railroad track, operating devices associated electrically with each section of track for causing a selective operation of said signal receiving device, and a contact making device movable along said sections of railroad track for actuating said operating devices during the time said contact making device is in their associated sections.

12. A railway signaling system comprising a plurality of sections of railroad track, an electric device electrically associated with each track section, from which a signal is desired, train wheels for operating said electric devices, and a selective signal receiving apparatus selectively responsive to signaling indications from the various said electric devices.

13. A railway signaling system comprising a plurality of sections of railroad track, track relays electrically associated with each track section from which a signal is desired, train wheels for operating said track relays, and a selective signal receiving apparatus selectively responsive to signaling indications from the various said track relays.

14. A railway signaling system comprising a plurality of sections of railroad track, an electric device electrically associated with each track section from which a signal is desired, train wheels for operating said electric devices, a selective signal receiving apparatus selectively responsive to signaling indications from the various said electric devices, and current supplying means for causing the operation of said signal receiving apparatus.

15. A railway signaling system comprising a plurality of sections of railroad track, track relays electrically associated with each track section from which a signal is desired, train wheels for operating said track relays, a selective signal receiving apparatus selectively responsive to signaling indications from the various said track relays, and current supplying means for causing the operation of said signal receiving apparatus.

16. A railway signaling system comprising an electric signal receiving apparatus, current supplying means for furnishing currents of different electrical character to selectively operate said signal receiving apparatus, a plurality of sections of railroad track, electrical current conducting means for associating the various sections of railroad track with the signal receiving apparatus and current supplying means, and circuit controlling apparatus electrically controlled by car wheels in the said track sections for causing a change of circuit conditions to operate the signal receiving apparatus through the agency of the current supplying means.

17. A railway signaling system comprising an electric signal receiving apparatus, current supplying means for furnishing currents of different electrical character to selectively operate said signal receiving apparatus, a plurality of sections of railroad track, electrical current conducting means for associating the various sections of railroad track with the signal receiving apparatus and current supplying means, and track relays electrically controlled by car wheels in the said track sections for causing a change of circuit conditions to operate the signal receiving apparatus through the agency of the current supplying means.

18. A railway signaling system comprising an electric signal receiving apparatus, current supplying means for furnishing currents of different frequency to selectively operate said signal receiving apparatus, a plurality of sections of railroad track, electrical current conducting means for associating the various sections of railroad track with the signal receiving apparatus and current supplying means, circuit controlling apparatus electrically controlled by car wheels in the said track sections for causing a change of circuit conditions and to operate the signal receiving apparatus through the agency of the current supplying means.

19. A railway signaling system comprising an electric signal receiving apparatus, current supplying means for furnishing currents of different frequency to selectively operate said signal receiving apparatus, a plurality of sections of railroad track, electrical current conducting means for associating the various sections of railroad track with the signal receiving apparatus and current supplying means, track relays electrically controlled by car wheels in the said track sections for causing a change of circuit conditions and to operate the signal receiving apparatus through the agency of the current supplying means.

20. A railway signaling system comprising a plurality of sections of railroad track, a signal receiving apparatus associated with said sections, and electric means including train wheels for sending selective indications to said signal receiving apparatus from said sections.

21. A railway signaling system comprising a plurality of sections of railroad track, a signal receiving apparatus associated with said sections, and electric means including closed circuit track portions controlled by train wheels for sending selective indications to said signal receiving apparatus from said track sections.

22. A railway signaling system, comprising a plurality of sections of railroad track, a signal receiving apparatus associated with said sections, electric means including train wheels, adapted to send a plurality of simultaneous selective indications to said signal receiving apparatus from said sections.

23. A railway signaling system, comprising a signaling circuit and a plurality of sections of railroad track, a signal receiving apparatus associated with said sections, and electric means, including closed circuit track portions adapted to send a plurality of simultaneous selective indications to said signal receiving apparatus from said sections over said circuit.

24. A signaling system for railways, comprising a selective signal receiving device associated with a plurality of sections of a railroad track, and electric means associated with each section of track, and controlled by the presence of cars in their respective sections, to selectively operate said selective signal device, said means being adapted to send a plurality of simultaneous noninterfering signals to said device.

25. A signaling system for railroads, comprising a selective signal receiving device, associated by means of a circuit, with a plurality of sections of a railroad track, and electric means, associated with each section of track and controlled by cars in their respective sections, adapted to send a plurality of noninterfering simultaneous selective indications to said signal receiving device.

In witness whereof, I hereunto subscribe my name this sixth day of April, A. D. 1907.

MAX W. ZABEL.

Witnesses:
W. L. DOLMAN,
F. B. BOICE.